Nov. 11, 1958
J. HUGHES ET AL
2,860,204
ELECTRICAL RELAY
Filed March 13, 1956
2 Sheets-Sheet 1
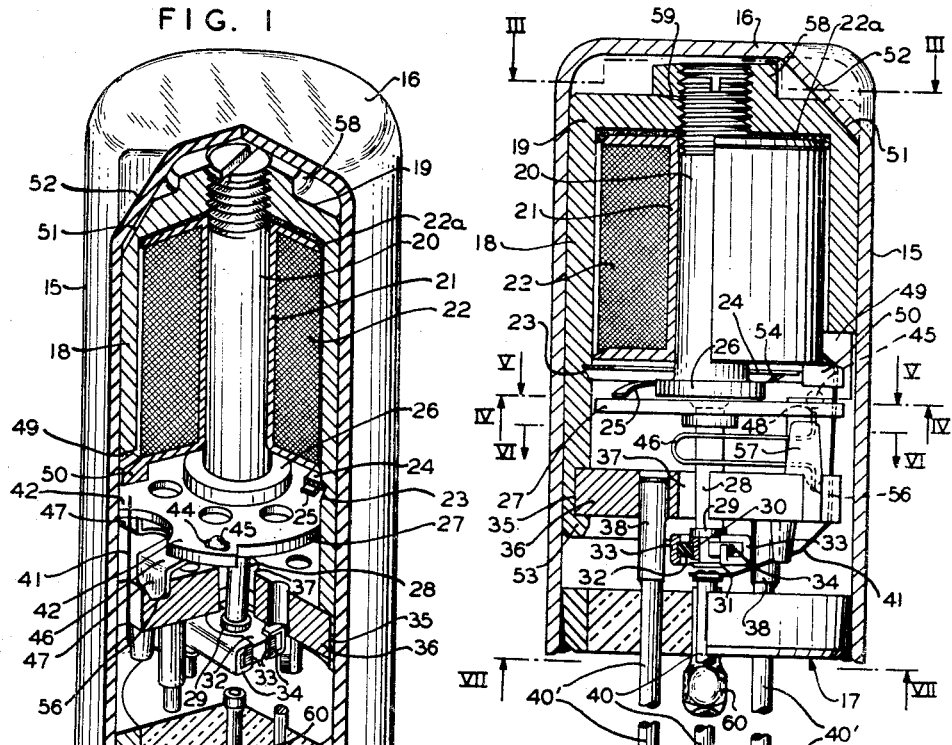
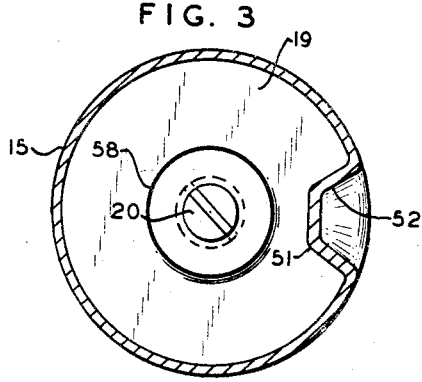
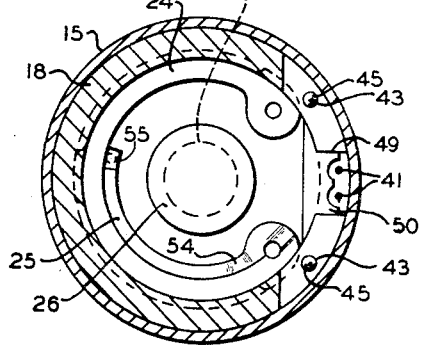
INVENTORS
JOHN HUGHES
OWEN HUGHES
BY
ATTORNEY Nov. 11, 1958

J. HUGHES ET AL 2,860,204

ELECTRICAL RELAY

Filed March 13, 1956

INVENTORS
JOHN HUGHES
OWEN HUGHES
BY
ATTORNEY

United States Patent Office 2,860,204
Patented Nov. 11, 1958

2,860,204

ELECTRICAL RELAY

John Hughes and Owen Hughes, Jackson Heights, N. Y., assignors to Bulova Watch Company Inc., Flushing, N. Y., a corporation of New York Application March 13, 1956, Serial No. 571,206

6 Claims. (Cl. 200—87)

Considered in its general aspect, this invention proposes a construction of electrical relay adaptable to be made of extremely small size, and for indication of comparative dimensions, the manufactured embodiment thereof will be approximately the length of an ordinary sewing thimble, or perhaps slightly less, and will have a diameter less than such a thimble. Both because of the multiplicity of instruments employed in airplanes, for instance, and therefore the need to conserve space and to minimize weight, an electrical relay having the characteristics of small size and mass is of great importance. Not only in airplanes, but elsewhere, vast reduction of instrumentation size and weight has been accomplished by incorporation of transistors, and it is a feature of the present invention to obtain a corresponding reduction in size and weight of electrical relays used in conjunction with such transistors.

Closely related to the foregoing recitation of general objective, the invention contemplates a construction, notwithstanding its small size, that will be usable with high currents and voltages.

Another general object of the invention is to provide a structure which is not susceptible to injury from physical shocks even though its constituent parts, because of small size, are of necessity quite delicate.

The invention also proposes a construction which can be manufactured as a plurality of sub-assemblies readily put together as a unit and thereafter inserted into a case and be hermetically sealed therein both for protective purposes and to enable the relay mechanism to function in a desired medium, such as inert gas or vacuum.

Somewhat more specifically, the invention proposes a construction with minute spacing of the armature from the core of the magnet and yet obtain an adequate operating displacement of the movable contact from the fixed contact within the limited confines of the casing.

An essential object of the invention is to provide a substantially frictionless pivoting of the armature.

A further object of the invention is to assure engagement of the movable contacts with the plurality of fixed contacts and assure certainty of make-and-break of the controlled current thereby.

Other objects, advantages and beneficial constructional features will appear to persons skilled in the art to which the invention appertains as the description proceeds, both by direct recitation thereof and by implication from the context.

Referring to the accompanying drawings, in which like numerals of reference indicate similar parts throughout the several views, and in which the illustrated size of the relay and its parts is magnified many times from the actual relay;

Figure 1 is a cut-away perspective view of the relay of presently preferred construction;

Figure 2 is an axial-diametric sectional view thereof;

Figure 3 is a cross section on line III—III of Fig. 2;

Figure 4 is a cross-section on line IV—IV of Fig. 2, looking upward;

Figure 5:
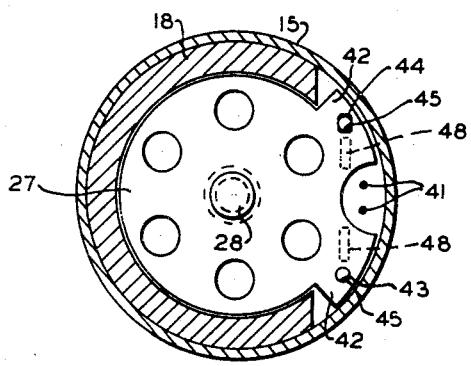
Figure 5 is a cross-section on the same line IV—IV of Fig. 2, but looking upward as indicated by arrows V, V.
Figure 6:
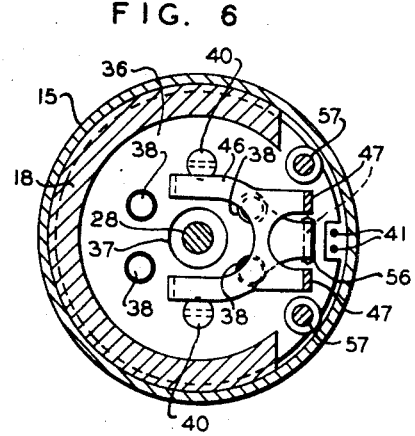
Figure 6 is a cross-section on line VI—VI of Fig. 2, looking downward as indicated by the arrows.
Figure 7:
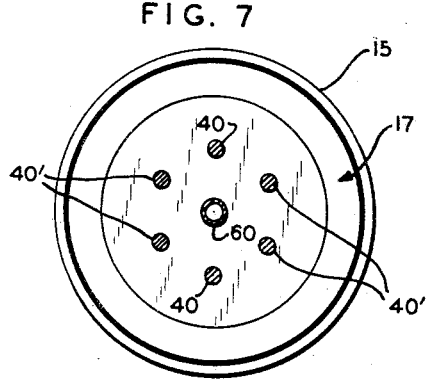
Figure 7 is a sectional end view looking upward at line VII—VII of Fig. 2.
Figure 8:
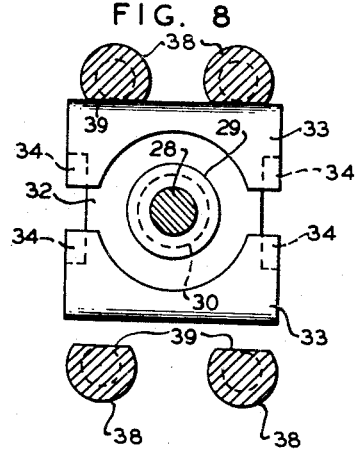
Figure 8 is a cross section through the armature post and fixed contacts above the movable contact which is accordingly shown in plan.

In the specific embodiment of the invention disclosed herein, the relay has been shown in the drawings in an arbitrarily selected position, and it is to be understood that this is done without imposing limitation to its use in the position indicated. Likewise the description will orient parts in agreement with the selected position of the relay illustrated, without confining the invention to any particular angularity of disposition of the relay. Thus, the relay is shown having an elongated cylindrical casing 15 positioned axially upright and having an integral dome end closure 16 at its upper end and an applied sealing closure, designated generally by numeral 17, at its lower end.

In its general organization, the relay includes a hollow cylindrical housing 18 which has sliding fit for assembly purposes within said casing 15. Said housing has an end wall 19 proximate to the end closure 16 of the casing. Centrally of said end wall 19, threaded thereinto, is a depending metallic core or pole 20 which is coaxial to both said housing and casing. The core 20 extends through a spool 21 on which is wound a magnet coil 22, the spool and coil being within said housing and substantially filling the space radially between the core and inner cylindrical face of the hollow of the housing. At a level just below the lower end of the spool, the inner wall or surface of the housing has a circumferential notch 23 for receiving a snap ring 24 which is also constituted as a basal portion of an armature spring 25, as an integral part therewith. The magnet is retained in the housing by cement 22a or other means. The lower end of the core or pole 20 is preferably somewhat larger than the shank portion of said core thus providing a head or pole terminal 26 presenting a flat under surface of considerable area.

Located below the pole terminal 26 is an armature 27 pivoted to move toward and away from said under surface of the pole terminal. This armature is metal of generally circular disc shape with its periphery in proximity to the inner circumferential wall surface of the housing so as to provide an almost complete metallic path for the magnetic flux from the pole, through the armature, and back through the housing to the other end of the core. Location of the armature upper surface in close proximity to the flat under face of the pole terminal 26 reduces air-gap losses in the flux path to a minimum. To maintain such gap as small as possible, the pivotal movement of the armature is kept very small, but at the same time, provision is made to obtain an adequately great movement of armature-carried make-and-break contact element as will presently be described.

Rigidly staked to said armature disc, preferably coaxial therewith and depending therefrom, is a post 28 which undergoes a lateral swinging transition consequential upon the up and down swing of the armature on its pivot, and the lateral displacement of the lower portion of said pole will be considerable with only a slight pivotal movement of said armature. Near the lower end of said post 28 is provided an integral circumferential collar 29, and below said collar is mounted a bushing 30. Below the bushing, the end of post 28 is peened or dilated to form a retaining shoulder 31 by which the bushing is prevented from displacement from said post, but affording non-gripping retention so that the bushing remains free to oscillate.

Aforementioned make-and-break contact element comprises an insulative body 32 of washer-like proportions but preferably having a rectangular outer contour, and the above-described bushing 30 is located centrally of and passes through said body 32 from top to bottom thereof and is tightly engaged therein so as to be retained thereby on said post. At two opposite sides of said body, crimped in place thereon so as to remain permanently intact therewith, are metallic contacts 33, one for each of said opposite sides, and each shown as of channel shape with the web thereof extending along the entire contiguous side of the rectangular body in each instance, but with the two contacts physically separated from each other by said body and therefore electrically distinct. Provision and crimping of end tabs 34 of said contacts at other side edges of the body will avoid any possibility of the contacts creeping longitudinally. For distinguishing purposes, these contacts 33 carried by post 28 and armature 27, are herein referred to as the movable contacts.

The lower end of housing 18 is provided with an internal circumferential rabbet 35 in which is seated a cap 36 of substantially disc shape and preferably made of suitable insulative material. There is a central aperture 37 through this cap for passage of the above-described post 28 therethrough and affording ample space for the lateral swinging transition of said post without interference by said cap. Moulded in or press fitted in said cap so as to be fixed with respect thereto are a plurality of fixed contacts 38 arranged in pairs opposite to and adapted to be engaged by the respective movable contacts 33. The sides of these fixed contacts facing the movable contacts are preferably flattened, as at 39 so as to obtain surface to surface engagement when the movable contacts are swung against the fixed contacts. The lower ends of contacts 38 are in proximity to the top face of lower sealing closure 17. Said sealing closure has lead-in wires or connections sealed therethrough, two of which, designated by numerals 40 are made fast at their upper or inner ends to conecting wires 41 to the magnet coil 22. Other lead-in wires 40' are arranged to axially align with said fixed contacts and at their upper ends are butt welded or otherwise secured to the lower ends of said contacts. It will now be appreciated that when the armature is moved on its pivots in one direction, for instance upwardly under influence of the pull of the magnet, the post 28 attached thereto is given a lateral transitional swing and carries the movable contact element toward one pair of fixed contacts 38 and since said element, by virtue of the rotative mounting of its bushing 30 on the post, may swivel into engagement with one contactor 33 spanning those two fixed contacts, an electrical circuit is completed from one lead-in wire to another. Correspondingly, when the armature moves in its other direction, in this instance downwardly, the movable contact element swings to the other pair of fixed contacts and the circuit then sifts to completion through the lead-in wires thereto.

Essential features of the invention are involved in the armature construction, mounting, retention and spring actuation of which cursory mention has been made in the above description of the general organization of the relay but with respect to which more detailed consideration will now be given.

At one chordal side of the armature the same extends radially for a part of the circumference beyond the general size and disc-shape of the armature, thereby providing ears 42 that project substantially to the inside surface of casing 15, the housing 18 being suitably cut away to accommodate said ears. Accordingly the end edge of the housing where cut away directly overlies said ears, and in said end edge and correspondingly in the upper side of said ears are pairs of sockets 43, 44 cooperating to receive in each pair a ball 45 seated in the sockets of the respective pairs of sockets. The sockets 43 of one pair and one socket of the other pair are preferably partially spherical hollows, whereas one of the sockets of said other pair, namely 44, is a partial cylinder the center line of which is coincident with a chordal line passing through the center of the spherical pair of sockets. The partially cylindrical socket assures seating of the ball therein notwithstanding slight discrepancies in location. The other sockets that are partial spheres can thus assume exact registration with the ball seating properly in each, and by virtue thereof the armature will be restrained from lateral movement. The two balls, the centers being on a chordal line, constitute substantially frictionless pivots for the armature enabling the mid part of the armature to move toward and away from the magnet core.

In order to hold the armature and balls properly seated, a spring 46 is provided and arranged to exert a pressure perpendicular to the plane of the armature and at the chordal line between ball centers. The spring shown as employed herein is U-shaped in plan so as to extend inwardly beneath the armature and pass the post 28 on opposite sides thereof. Said spring 46 is also U-shaped viewed in front elevation, the leg ends thereof resiliently tending to spread one from the other equally on opposite sides of a center line of the U-shape. The ends of the legs of the spring have oppositely directed feet 47 projecting therefrom, and preferably the leg of the spring that is proximate to the armature has two such feet in a common plane and adapted to engage at their toe ends in correspondingly aligned declivities 48 on the under face of the armature paralleling the chordal line between ball centers above referred to. There is consequently no moment of force imparted by the spring 46 tending to swing the armature, the entire force of the spring being directed solely for seating the armature against the balls and the balls into the sockets of the housing.

It is opportune to here mention that at the middle of the cut-out in the housing provided, as above described, to accommodate the ears of the armature, that the said housing 18 has an upward slot 49 and that the bottom end of spool 21 has a radially projecting lug 50 engaging in said slot for preventing the spool from rotating in the housing. At the dome end of the housing, one side thereof is provided with a dimple 51 adapted to be engaged by a similar dimple 52 in the casing, thereby keeping the housing from rotating in said casing 15. Cap 36 at the lower end of the housing, seated in the rabbet 35 thereof, may be retained therein and also prevented from rotation by any suitable means, such as by in-turning of the lower edge of the housing at intervals, as indicated at 53 in Fig. 2.

Figure 9:
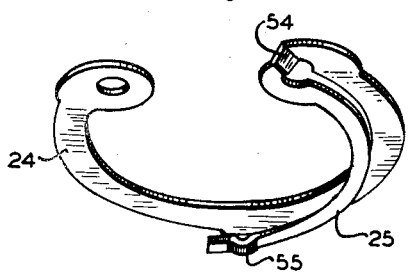
Figure 9 is a perspective view of the armature spring which acts contra to the magnetic pull on the armature.
Figure 10:
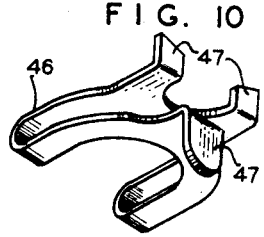
Figure 10 is a perspective view of a certain retaining spring by which the armature is maintained in place on its pivotal mounting.

Mention has heretofore been made of the presence of armature spring 25 in connection with explanation that the basal portion 24 whereof constitutes a snap ring engaged in circumferential notch 23 of the housing. By reference to Figures 2, 4 and 9, the detail construction of the preferred form of such a spring will be clearly evident. The basal portion thereof has a discontinuity which enables it to be snapped into place in the receiving notch. Next to one of the ends constituted by inclusion of such a discontinuity, the material constituting the spring extends backwardly in an arc following the curvature of the inner edge of the basal portion, and this backwardly extending arcuate portion constitutes the resiliently effective armature spring 25. Said armature spring is accordingly integral at one end with the basal portion 24 at said one end of the basal portion, and is shown offset at 54 where joining that end, and then diverges away from the plane of the basal portion to a free end. Proximate to said free end, the metal of said spring is provided with a transverse rib 55 and it is this rib which engages against the armature and exerts resilient pressure on the armature diametrically opposite from the chordal line of pivoting of the armature, and thereby tending to maintain the armature depressed away from the pole terminal 26 of the magnet.

It also is important to point out that cap 36 is provided with a declivity 56 to receive the downwardly directed foot 47 of the seating spring 46, and that at opposite ends of that declivity the cap provides pillars 57 which rise to close proximity to the under side of the armature underlying the same at the chordal line between the ball centers. These pillars are close enough to the armature to be engaged thereby and stop further separation of the armature from the under cut-out edge of the housing before there is sufficient space developed to permit the balls to escape from their sockets. The pillars are normally out of contact from the armature, and function as indicated only under unusual circumstances, such as may be occasioned by a severe physical shock affecting the device.

In factory assembly of the relay, the core or pole 20 is adjusted longitudinally by rotating it with a screw driver before casing 15 is applied. In order to lock said core in its adjusted position, the end wall 19 of the housing is made with a protruding neck 58 around the threaded screw hole and is given a chordal slit 59 which intercepts the screw hole. After adjustment of the core has been made, the metal above the slit is squeezed down to substantially close the slit and thereby effects a clamping of the threads of the housing upon the threads of the core. The closer the spacing of armature and core, the greater will be the sensitivity but shorter life of the contacts.

Various parts above described can be preassembled as sub-assemblies, and then the several sub-assemblies put together as a unit, after which the casing is applied and lower sealing closure 17 is then applied and sealed. Said sealing closure may be provided with a tubulation 60 through which air is withdrawn and replaced by an inert gas, such as nitrogen or helium. Use of such a gas overcomes erosion that would otherwise take place at the electrical contacts when sparking occurs. After the gas is introduced, the tubulation is pinched closed and/or solder sealed, and the relay is then in condition for operation and use.

In operation, it will be understood that the armature 27 has a normal position under influence of spring 25 which swings the armature in a direction sloping slightly downward from its pivotal mounting on balls 45. Since post 28 is fixed on the armature, it will likewise be tilted in a direction that brings its lower end toward the right as viewed in Fig. 2. Such swing is stopped by engagement of the right-hand movable contact 33 with and seating thereof against the flats 39 of the two fixed contacts 38 of one pair of contacts at the right in this instance, and under this condition the other or left-hand movable contact 33 is out of engagement from the pair of fixed contacts 38 at the left of Fig. 2. This means that the relay is making a closed electrical circuit through two of the lead-in wires 40' at the right and establishes an open circuit through the other two lead-in wires 40' at the left.

Upon applying a control current to the magnet coil 22 by way of lead-in wires 40 and the connecting wires 41, a magnetic flux is produced that circulates largely in metal, provided by the core or pole 20, pole head 26, armature 27 and housing 18, and produces an attractive force upon said armature which then swings upwardly until stopped by the engagement of the left-hand movable contact 33 with the adjacent left-hand fixed contacts 38 against the flats 39 thereof and thereby the circuit is completed thereat and opened at the other pair of fixed contacts. The fact that the armature is pivoted on balls 45, enables the armature to be moved with small currents to the magnet, a most desirable feature for use with transistors. This operation by small magnet currents is also aided by the small angle of swing required of the armature, which enables the armature to be located at all times in close proximity to the pole head 26.

It is further to be observed that the utilization of depending post 28 on the armature obtains a multiplication of movement at the lower end of the post considerably greater than the movement of the armature toward and away from the pole head. The movable contact element has both an oscillatory and a limited teetering movement permitted with respect to the post, and therefore either of its contactors 33 may seat firmly against a respective pair of fixed contacts 38 adjacent thereto without need for exactitude of location of the several fixed contacts. Slight motion of the armature, therefore, obtains a larger make-and-break motion for the movable contacts with assurance of the engagement at contacting position being firm with sparking correspondingly avoided, and an assured complete breaking of contact to the other pair of fixed contacts will be obtained. Such sparking as may occur in breaking contact is rendered harmless by inclusion of the operating parts within a sealed casing 15 and with an inert gas filling the casing. Even with the tiny size of the device and correspondingly small gaps, it is successfully operates in control of currents of one ampere at a million cycles, as one example of its use and capabilities.

We claim:

1. An electrical relay comprising a cylindrical housing, said housing having an open end, a magnet in said housing, said magnet having a pole terminal directed outwardly of said open end of the housing, an armature pivoted at one side of said housing and extending across said pole terminal in proximity thereto, said armature having its periphery in proximity to said housing, a snap ring in said housing between said magnet and armature, and an armature spring integral with said snap ring and having engagement with said armature tending to resiliently swing said armature in a direction away from said pole terminal.

2. An electrical relay comprising a cylindrical housing, a magnet coaxially in said housing, an armature within and transverse to said housing and at an end of said magnet, means pivoting said armature at one side of the axis of the magnet, a post on said armature, said post having an end remote from said armature and movable laterally when the armature swings on its pivoting means, said remote end of the post having a contact element thereon projecting at opposite sides of said post, and fixed contactors in the path of lateral movement of the projections of said contact element for engagement by said contact element.

3. An electrical relay comprising a cylindrical housing, a magnet coaxially in said housing, an armature transverse to said housing and at an end of said magnet, means pivoting said armature at one side of the axis of the magnet, a post on said armature approximately alined with and projecting away from said magnet, said post thereby having an end remote from said armature and movable laterally when the armature swings on its pivoting means, said remote end of the post having a contact element thereon projecting at opposite sides of said post, and pairs of fixed contactors in the path of lateral movement of the projections of and engageable in pairs by said contact element, said contact element being free to oscillate on said post in a direction lateral thereto and toward said contactors thereby assuring engagement of said contact element with both contactors of a pair of contactors when the post is swung toward the same.

4. An electrical relay comprising a cylindrical housing, a magnet coaxially in said housing, an armature transverse to said housing and at an end of said magnet, means pivoting said armature at one side of the axis of the magnet, a post on said armature approximately alined with and projecting away from said magnet, said post thereby having an end remote from said armature and movable laterally when the armature swings on its pivoting means, said remote end of the post having a contact element thereon comprising a body of insulative material extending crosswise of the post and having metallic contacts along and projecting at the two opposite edges thereof that move laterally when the armature moves, said contacts being electrically distinct from each other and from the post, and pairs of fixed contactors in the path of lateral movement of said contacts each pair being engageable at once by a respective one of said contacts, said contact element being free to oscillate coaxially on said post thereby assuring engagement of a contact with both of the contactors of a respective pair of contactors when the post is swung toward the same.

5. An electrical relay comprising a cylindrical housing, a magnet coaxially in said housing, an armature transverse to said housing and at an end of said magnet, means pivoting said armature at one side of the axis of the magnet, a cap for said housing beyond said magnet and armature said cap having a central aperture therethrough, a post on said armature approximately alined with and projecting away from said magnet and loosely through said aperture of said cap, said post thereby having an end remote from said armature and movable laterally of and beyond said cap, said remote end of the post having a contact element thereon, and contactors held fixed by said cap and projecting therefrom in a direction beyond the same from the housing and engageable at inward sides thereof by said contact element when the post is swung toward said contactors.

6. An electrical relay comprising a housing, said housing having a part thereof cut away providing thereat an edge proximate to an end of said magnet, an armature opposite said end of the magnet and projecting into said cut away part across said end edge of said cut away part, a cap for said housing beyond said magnet and armature, said end edge of the cut away part and said armature having two pairs of complementary sockets, two balls, one in each pair of sockets and constituting pivotal mounting of said armature on a line transverse to said armature, and a pillar fixed on said cap and projecting into proximity to said armature at substantially said line of pivoting thereof and close enough to prevent spreading of the armature from said end edge an amount less than the diameters of said balls thereby preventing escape of the balls from said sockets.

References Cited in the file of this patent

UNITED STATES PATENTS

| | | |
|---|---|---|
| 403,626 | Van Epps | May 21, 1889 |
| 586,888 | Williams | July 20, 1897 |
| 650,915 | Schibner et al. | June 5, 1900 |
| 784,635 | Setter | Mar. 14, 1905 |
| 1,282,426 | Hynes | Oct. 22, 1918 |
| 1,354,880 | Canfield | Oct. 5, 1920 |
| 1,468,789 | Leich | Sept. 25, 1923 |
| 2,092,478 | Sommermeyer | Sept. 7, 1937 |
| 2,428,218 | Herbst | Sept. 30, 1947 |
| 2,538,020 | Lomholt | Jan. 16, 1951 |
| 2,632,072 | Zellner | Mar. 17, 1953 |